Patented Feb. 5, 1952

2,584,148

UNITED STATES PATENT OFFICE 2,584,148

PRODUCTION OF A CATALYST FROM CLAY

George Alexander Mills, Ridley Park, Pa., assignor to Houdry Process Corporation, Wilmington, Del., a corporation of Delaware No Drawing. Application May 28, 1946, Serial No. 672,917

4 Claims. (Cl. 252—450)

1

The present invention relates to the preparation of adsorptive contact masses and is especially concerned with the preparation of such masses for use as catalysts particularly in hydrocarbon conversion processes.

Certain types of clay, of which the sub-bentonites are a familiar example, are conventionally activated by acid treatment to produce active contact masses of good adsorbent properties useful in decolorizing and other relations. Such acid-activated clays in many instances also display catalytic activity of sufficiently high level and desired selectivity, such that they have found extensive commercial use as catalysts in hydrocarbon conversion processes. There are, however, many common and abundant clays, for example kaolin clays, which do not respond to conventional acid activation to produce contact masses of required adsorptivity. These clays, as well as others which, on the other hand show good adsorptivity in the acid-treated or even raw state, such as fuller's earth, do not respond to conventional acid-activation to furnish catalysts of required selectivity and desired high level of activity for use in hydrocarbon conversion processes. I have found that clays which do not sufficiently respond to acid-treatment, including clays of the kaolin type, may be activated by novel methods as hereinafter described and cracking catalysts of good activity and desired selectivity thereby obtained.

The term "activity" as herein employed with respect to catalysts, has reference to the relative efficiency of the catalyst when employed in hydrocarbon cracking operations of producing gasoline from higher boiling petroleum products.

The relative efficiency or index of activity of a catalyst for use in hydrocarbon cracking and reforming operations can be determined and compared by a test of its performance in catalytic cracking of a standardized petroleum fraction under selected operating conditions. One such test in common use is that known as the "CAT-A" method described in "Laboratory Method of Determining the Activity of Cracking Catalysts," by J. Alexander and H. G. Shimp, National Petroleum News, August 2, 1944, at p. R 537. In accordance with the described test, a selected light east Texas gas oil is contacted with the catalyst at a temperature of 800° F. and atmospheric pressure at a liquid space rate of 1.5 (volume of liquid to volume of catalyst per hour) during a ten-minute operating period. The liquid products are fractionated and the volume of 410° end point motor gasoline measured; the activity of the cata-

2 lyst is denoted in terms of the percentage of the gasoline yield on the volume of gas oil charged. The weight per cent of coke deposited, the weight per cent of normally gaseous products formed, and specific gravity (referred to air) of such gas are also measured.

In its broad aspect the present invention comprises the activation of clay, of normally low activity, and which is not brought to high activity level by conventional acid treating. I have found that by subjecting such clays to a basic treatment, the capacity of the clay to incorporate and retain an activating component is increased, so that by impregnating the treated clay with such activating component or with an agent reactive to form such component therein, the activity of the clay is materially improved. Thus, in accordance with a preferred embodiment, a raw clay of the kaolin type is initially acid treated, washed, dried, formed into pellets and subjected to heat treatment. The heat-treated pellets are soaked in a dilute solution of sodium hydroxide for sufficient time to increase the sodium content thereof, and after washing with water the pellets are further treated with a solution of an aluminum salt such as aluminum sulfate, effecting replacement of the sodium by aluminum, thereby incorporating alumina in the pellets.

Acid treatment of the clay is not always required, since raw as well as acid-treated clays which are below desired activity may be brought to high activity level by the incorporation of alumina as described, and even raw clays of poor activity considerably improved thereby. In hydrocarbon cracking and reforming operations, the gasoline yield obtained is of considerable significance and accordingly the more important catalysts produced in accordance with the invention are those of high activity level, for instance those giving yields of 30% or more gasoline as tested by the described "CAT-A" method.

For the initial acid treatment of the raw clay, if practiced, mineral acid of moderate concentration may be used. Thus, aqueous acid solutions of the usual concentrations and proportions to clay weight as are employed in known activation of conventional acid activatable clays may be used, if desired, and preferably at an elevated temperature below the boiling point of the acid solution. For instance, in the preferred treatment, sulfuric acid is employed of 5% to 60% concentration calculated on the total water content of the mix, the quantity of acid on anhydrous basis ranging from about 0.20 to over 1.0 parts of the dry clay, the acid treatment being effected at a temperature of about 200° F. Under these conditions the necessary acid treatment can be accomplished in about 3 to 8 hours.

If the activating component is to be incorporated in pelleted clay, as is preferred, the acid-treated clay is formed into pellets of suitable size in any known or desired manner, but preferably following a purification treatment such as washing to remove adhering acid, and water-soluble materials. After draining the wash water or filtering, the clay is dried and ground to powder. Pellets may be formed by compressing or stamping the dry powder to units of desired size and shape, but it is preferred to first rewet the powder with a regulated quantity of water to form a plastic mix and cast or extrude the wet mix. To assist extrusion, removable binders or volatile water-immiscible liquids such as kerosene may be added. As an example of an extrusion operation, the clay powder is mixed with about an equal weight of water and the mix extruded in a macaroni machine through dies obtaining strands of 2 to 4 mm. diameter, which are cut respectively to corresponding lengths. The obtained pellets are then dried not too rapidly, which may be done in ovens provided with forced air circulation, so that the moisture content is reduced to about 20% or somewhat below. Such drying may be effected but is not restricted to temperatures in the order of 100–250° F. requiring a period of several hours for the operation. The dried pellets are then subjected to heat-treatment to drive off volatiles and to stabilize the pellets, which may be effected at temperatures above 500° F. in air or other non-reactive gas to which small amounts of steam may be added. As an example of a preferred heat-treatment, the pellets may be subjected to calcination in air at 1050° F. for 2 hours.

By acid treatment as above described, acid activatable clays, such as montmorillonite clays of the sub-bentonite family, can be readily made into catalysts of fairly high activity level, but by such treatment of the types of clay with which the invention is concerned, such as kaolin clays, contact masses having a high level of catalytic activity are generally not obtained. The activity of clays of the latter class is improved, in accordance with the invention, by treatments such as hereinafter described.

Heat-treated pellets produced from the kaolin clay by the above-described or an analogous procedure, in accordance with the preferred embodiment are soaked in dilute sodium hydroxide solution to increase the sodium content and thereby enhance the adsorptivity or reactivity of the pellet, in preparation for the subsequent step. The concentration of the sodium hydroxide employed should be below that which will effect disintegration of the pellets under the treating conditions employed and preferably insufficient to dissolve any substantial portion of the silica or alumina components of the clay. For example, the treatment may be advantageously carried out in 4 to 10% sodium hydroxide solution at room temperature over a period of 8 or more hours, employing a quantity of liquid sufficient to cover the pellets. At the temperature and concentration indicated, the treatment with the sodium hydroxide solution may be prolonged over several days, if desired, without untoward effect, thereby increasing the quantity of sodium incorporated. Extended treatment beyond about 35 to 40 hours generally serves no useful purpose.

The treated pellets are thereafter washed with water to free the same of adhering or physically held sodium hydroxide and other soluble materials. The washed product is then treated with an aluminum salt solution in sufficient excess to assure reaction with or replacement of all of the available sodium compound in the pellets. Thus, the pellets at this stage may be treated with a 10 to 20% (by weight) solution of aluminum sulfate —$Al_2(SO_4)_3.18H_2O$—, the treatment being advantageously repeated several times. As a result of the replacement of sodium by aluminum, alumina (as oxide or hydroxide) is incorporated in the pellets apparently in complex combination with natural clay components. After washing the pellets until free of sulfates (or other anions of the aluminum salt employed) in the wash water filtrate, the pellets are dried and preferably again heat treated and calcined as before or at a different selected temperature in the presence or absence of steam, to stabilize the same at desired activity level governed by the type of petroleum stock or conversion operation in which the same are to be used.

The aluminum salt solution used in the above process may be advantageously obtained from the acid extract derived in the initial acid treatment of the raw clay. Since such extract, however, will contain in addition to the aluminum salts of the acid, undesired metal salts such as those of iron and in some instances titanium, it is preferred to purify the extract to obtain a substantially pure aluminum salt solution for use in the subsequent step of treating the pellet. Such purification may be effected by selective precipitation such as by treatment with strong caustic solution to precipitate the iron (and other insoluble hydroxides) while retaining the aluminum in solution. Other methods of separating iron from aluminum solutions may be employed, such as those described in my joint co-pending application Serial No. 666,179, filed April 30, 1946, issued November 29, 1949 as U. S. Patent 2,489,309.

*Example I*

The clay employed for the several preparations of pellets in this example was a kaolin from the region of Putnam County, Florida, known commercially as "Edgar E. P. K." and having the following composition on a dry (105° C.) sand-free basis.

| | | |
|---|---|---|
| Ignition loss | percent | 12.9 |
| $SiO_2$ | do | 46.6 |
| $Al_2O_3$ | do | 38.8 |
| $Fe_2O_3$ | do | 1.0 |
| CaO | do | 0.44 |
| MgO | do | 0.23 |
| $TiO_2$ | do | 0.35 |
| Alk. Metal (as oxides) | do | 0.52 |

(a) The raw clay was milled with 20% sulfuric acid, employing 0.55 parts of acid (anhydrous basis) to dry weight of clay, at 93° C. for eight hours. The acid was drained and the clay washed with water until the filtrate tested free of $SO_4$ ions, after which the clay was dried, worked with water to moldable consistency and extruded to form 4 mm. cylindrical pellets. The pellets were calcined for 2 hours in air at 1050° F.

(b) A portion of the calcined pellets from (a) above were placed in 6% sodium hydroxide solution for eight hours at room temperature, then washed fifteen times with warm water. Following washing, the pellets were treated 3 times with 16% aluminum sulfate —Al$_2$(SO$_4$)$_3$.18H$_2$O— solution using amounts sufficient to cover the pellets each time. The pellets were then washed with water until the filtrate was SO$_4$ free, dried and calcined at 1050° F. for two hours in air.

(c) For comparison, the raw kaolin used above was pelleted by extrusion without previous acid treatment and similarly treated with solutions of sodium hydroxide and aluminum sulfate and calcined as in (b), and (d) The untreated raw kaolin merely pelleted and similarly calcined.

The pellets from (a), (b), (c) and (d) above, separately tested in cracking of a light gas oil by the "CAT-A" method above described, gave the results tabulated below:

| | Catalyst | Gasoline | Coke | Gas | Grav. |
|---|---|---|---|---|---|
| Ia | Pellets from acid-treated Edgar kaolin | 28.0 | 1.9 | 4.8 | 1.29 |
| Ib | Pellets from (a) treated with NaOH+Al$_2$(SO$_4$)$_3$ | 36.0 | 3.4 | 9.6 | 1.48 |
| Ic | Raw clay pellets treated with NaOH+Al$_2$(SO$_4$)$_3$ | 16.7 | 3.6 | 6.3 | 0.71 |
| Id | Raw clay pellets | 10.9 | 3.6 | 3.3 | 0.43 |

*Example II*

The clay employed in the several preparations of pellets in this example was a kaolin obtained from the Eccles property in Putnam County, Florida which had the following composition by weight on an ignited basis (containing 10–20% sand):

SiO$_2$ _____percent__ 65.8
Al$_2$O$_3$ _____do____ 32.4
Fe$_2$O$_3$ _____do____ 1.4
CaO _____do____ 0.23
MgO _____do____ 0.21
TiO$_2$ _____do____ 0.69

(a) The clay was acid treated by a procedure similar to that in Example Ia above, using 30% sulfuric acid in a ratio of 0.60 (anhydrous basis) acid to dry weight of clay, the acid treatment being continued for four hours at about 200° F. The acid treated clay was washed, dried, pelleted and calcined as in Example Ia above.

(b) A portion of the obtained pellets were treated with sodium hydroxide solution and then with aluminum sulfate solution as in Example Ib, and similarly dried and calcined.

(c) For comparison, the raw Eccles kaolin was pelleted without previous acid treatment and similarly treated with a solution of sodium hydroxide for 24 hours, washed and then treated with aluminum sulfate solution, followed by drying and calcining as in (b) above, and (d) The untreated raw kaolin merely pelleted and similarly calcined.

The following results were obtained on testing samples of each of the above pellets in catalytic cracking by the "CAT-A" method:

| | Catalyst | Gasoline | Coke | Gas | Grav. |
|---|---|---|---|---|---|
| IIa | Pellets from acid-treated Eccles clay | 24.5 | 1.7 | 3.2 | 1.24 |
| IIb | Pellets from (a) treated with NaOH + Al salt | 31.9 | 2.5 | 7.1 | 1.41 |
| IIc | Raw clay pellets treated with NaOH + Al salt | 28.3 | 2.3 | 5.4 | 1.20 |
| IId | Raw clay pellets | 21.0 | 2.7 | 5.6 | 0.82 |

*Example III*

(a) The same Eccles kaolin as employed in the preceding example was pelleted in the raw state and then heat-treated at 1350° F. for 4 hours in steam.

(b) The obtained pellets were treated with dilute sodium hydroxide solution, washed, and then treated with aluminum sulfate solution as in Ib above. The pellets were finally calcined at 1050° F. for 2 hours in air.

In this instance the raw kaolin was brought to high activity level without preliminary acid treatment as will be noted from the following results obtained by the "CAT-A" method:

| | Catalyst | Gasoline | Coke | Gas | Grav. |
|---|---|---|---|---|---|
| IIIa | Raw clay pellets heat treated | 24.9 | 1.1 | 2.8 | 1.3 |
| IIIb | Pellets from IIIa treated with NaOH + Al salt | 31.2 | 3.2 | 7.4 | 1.35 |

Although in the preferred embodiment aluminum salts are employed to activate the clay, it is within the scope of the present invention in the preparation of contact masses for use as catalysts, to employ salts of other metals the oxides of which form catalytically active combinations with silica, such as salts of magnesium, zirconium or beryllium.

Obviously many modifications and variations of the invention as hereinbefore set forth may be made without departing from the spirit and scope thereof and therefore only such limitations should be imposed as are indicated in the appended claims.

I claim as my invention:

1. The method of producing active contact masses from kaolin clay normally yielding masses of low activity by acid-treatment which comprises subjecting the clay to heat-treatment at a temperature above 500° F., contacting the heat-treated clay with a dilute solution of an alkaline hydroxide, washing the alkali treated clay with water and thereafter replacing incorporated alkali metal in the clay with aluminum by treatment with a solution of an aluminum salt.

2. The method of producing active contact masses from a kaolin clay which comprises subjecting raw kaolin to treatment with mineral acid, forming the kaolin into pellets, subjecting the pellets to calcination at a temperature above 500° F., treating the calcined pellets with dilute sodium hydroxide solution, washing and drying the treated pellets and thereafter contacting the pellets with an aluminum salt solution.

3. The method of producing contact masses of high activity from a kaolin clay which comprises subjecting raw kaolin to treatment with mineral acid at elevated temperature for a time sufficient to increase the activity of the kaolin, purifying the acid-treated kaolin by removing adhering acid and water soluble substances, drying and shaping the purified kaolin to form pellets, subjecting the formed pellets to heat treatment at a temperature above 500° F., soaking the heat-treated pellets in dilute aqueous sodium hydroxide to incorporate a substantial quantity of sodium in the pellets without substantial disintegration of the pellets, washing the thus treated pellets in water, replacing the incorporated sodium in the pellets with aluminum by treatment with an aluminum salt solution, washing the pellets to remove soluble anions, drying and calcining the washed pellets.

4. The method of preparing an active catalyst from kaolin which comprises subjecting raw kaolin to treatment with mineral acid at elevated temperature to an extent sufficient to increase the catalytic activity of the kaolin, extruding the acid-treated kaolin to form pellets, calcining the pellets at a temperature above 500° F., incorporating sodium hydroxide in the formed pellets, washing and drying the pellets, and treating the dried pellets with an aluminum salt solution to replace the sodium in the pellets by aluminum.

GEORGE ALEXANDER MILLS.

REFERENCES CITED

The following references are of record in the file of this patent:

UNITED STATES PATENTS

| Number | Name | Date |
|---|---|---|
| 2,066,212 | McKellar | Dec. 29, 1936 |
| 2,203,850 | Tropsch | June 11, 1940 |
| 2,229,353 | Thomas et al. | Jan. 21, 1941 |
| 2,289,919 | Lee et al. | July 14, 1942 |
| 2,320,799 | Ruthruff | June 1, 1943 |
| 2,323,728 | Ruthruff | July 6, 1943 |
| 2,366,217 | Ruthruff | Jan. 2, 1945 |
| 2,374,313 | Veltman | Apr. 24, 1945 |
| 2,388,088 | Heidelberg et al. | Oct. 30, 1945 |
| 2,397,505 | Richardson | Apr. 2, 1946 |
| 2,403,753 | Pierce et al. | July 9, 1946 |
| 2,408,207 | Garrison et al. | Sept. 24, 1946 |
| 2,410,436 | Ewing | Nov. 5, 1946 |
| 2,414,736 | Gray | Jan. 21, 1947 |
| 2,440,756 | Oulton | May 4, 1948 |
| 2,466,046 | Shabaker et al. | Apr. 5, 1949 |
| 2,480,627 | Bodkin et al. | Aug. 30, 1949 |